(12) United States Patent
Rezaee et al.

(10) Patent No.: US 11,835,958 B2
(45) Date of Patent: Dec. 5, 2023

(54) PREDICTIVE MOTION PLANNING SYSTEM AND METHOD

(71) Applicants: Kasra Rezaee, Kitchener (CA); Peyman Yadmellat, North York (CA)

(72) Inventors: Kasra Rezaee, Kitchener (CA); Peyman Yadmellat, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 16/940,807

(22) Filed: Jul. 28, 2020

(65) Prior Publication Data

US 2022/0035375 A1 Feb. 3, 2022

(51) Int. Cl.
*G01C 22/00* (2006.01)
*G05D 1/00* (2006.01)
(Continued)

(52) U.S. Cl.
CPC ....... *G05D 1/0221* (2013.01); *B60W 60/0011* (2020.02); *G05B 13/027* (2013.01);
(Continued)

(58) Field of Classification Search
CPC ............. G05D 1/0221; B60W 60/0011; G05B 13/027; G06F 11/3089; G06F 11/3013;
(Continued)

(56) References Cited

U.S. PATENT DOCUMENTS

| 7,961,084 B2 | 6/2011 | Aso et al. |
| 8,112,225 B2 | 2/2012 | Eidehall et al. |

(Continued)

FOREIGN PATENT DOCUMENTS

| CN | 108875998 A | 11/2018 |
| CN | 109557912 A | 4/2019 |

(Continued)

OTHER PUBLICATIONS

B. Paden, M. Čáap, S. Z. Yong, D. Yershov and E. Frazzoli, "A Survey of Motion Planning and Control Techniques for Self-Driving Urban Vehicles," IEEE Transactions on Intelligent Vehicles, vol. 1, No. 1 2016.

(Continued)

*Primary Examiner* — Abby Y Lin
*Assistant Examiner* — Sohana Tanju Khayer

(57) ABSTRACT

Methods and systems for training a motion planner for an autonomous vehicle are described. A trajectory evaluator agent of the motion planner receives state data defining a current state of the autonomous vehicle and an environment at a current time step. Based on the current state, a trajectory is selected. A reward is calculated based on performance of the selected trajectory in the current state. State data is received for a next state of the autonomous vehicle and the environment at a next time step. Parameters of the trajectory evaluator agent are updated based on the current state, selected trajectory, computed reward and next state. The parameters of the trajectory evaluator agent are updated to assign an evaluation value for the selected trajectory that reflects the calculated reward and expected performance of the selected trajectory in the future states.

21 Claims, 8 Drawing Sheets

(51) Int. Cl.
*G05D 1/02* (2020.01)
*G06N 3/08* (2023.01)
*G05B 13/02* (2006.01)
*B60W 60/00* (2020.01)
*G06F 11/30* (2006.01)
*G06N 3/047* (2023.01)

(52) U.S. Cl.
CPC ......... *G06F 11/3089* (2013.01); *G06N 3/047* (2023.01); *G06N 3/08* (2013.01); *G06F 11/3013* (2013.01)

(58) Field of Classification Search
CPC ........ G06N 3/0472; G06N 3/08; G06N 3/006; G06N 3/0454
See application file for complete search history.

(56) References Cited

U.S. PATENT DOCUMENTS

| | | | |
|---|---|---|---|
| 11,146,479 B2* | 10/2021 | Plate | H04L 12/6418 |
| 2017/0277194 A1* | 9/2017 | Frazzoli | G05D 1/0212 |
| 2019/0107839 A1* | 4/2019 | Parashar | G05D 1/0219 |
| 2019/0243370 A1* | 8/2019 | Li | G05D 1/0088 |
| 2019/0387060 A1* | 12/2019 | Kentley-Klay | G06F 3/04842 |
| 2019/0392242 A1* | 12/2019 | Tariq | G06K 9/627 |
| 2020/0132488 A1* | 4/2020 | Slutskyy | B60W 60/0011 |
| 2020/0363813 A1* | 11/2020 | He | G05D 1/0217 |
| 2021/0096241 A1* | 4/2021 | Bongio Karrman | G06V 10/764 |
| 2021/0173402 A1* | 6/2021 | Chang | B60W 40/09 |
| 2021/0264795 A1* | 8/2021 | Mguni | G06Q 50/30 |
| 2021/0318683 A1* | 10/2021 | Luo | G01C 21/3453 |
| 2021/0319362 A1* | 10/2021 | Mguni | G06N 7/005 |
| 2021/0380099 A1* | 12/2021 | Lee | G08G 1/167 |
| 2022/0196414 A1* | 6/2022 | Wang | G05D 1/0274 |

FOREIGN PATENT DOCUMENTS

| | | |
|---|---|---|
| CN | 109991987 A | 7/2019 |
| CN | 110352330 A | 10/2019 |
| CN | 110646009 A | 1/2020 |
| CN | 110857085 A | 3/2020 |

OTHER PUBLICATIONS

M. Werling, J. Ziegler, S. Kammel and S. Thrun, "Optimal trajectory generation for dynamic street scenarios in a Frenét Frame," in IEEE International Conference on Robotics and Automation, Anchorage, AK, USA 2010.

W. L. S. S. A. S. B. Y. S. C. R. U. Wenyuan Zeng, "End-to-End Interpretable Neural Motion Planner," in IEEE Conference on Computer Vision and Pattern Recognition (CVPR), Long Beach, CA, USA 2019.

M. Bansal, A. Krizhevsky and A. Ogale, "ChauffeurNet: Learning to Drive by Imitating the Best and Synthesizing the Worst," in Robotics: Science and Systems, Freiburg im Breisgau, Germany Jun. 2019.

* cited by examiner

PREDICTIVE MOTION PLANNING SYSTEM AND METHOD

FIELD

The present disclosure is related to systems and methods for path planning for autonomous vehicles, including systems and methods for motion planning based on trajectory generation, evaluation and selection.

BACKGROUND

An autonomous vehicle may use different sensors to sense its surrounding environment and the vehicle's own operating parameters. An autonomous vehicle typically includes a planning system to plan future vehicle actions based on target objectives and the sensed data, and a vehicle control system generates control commands from the output of the planning system. Accordingly, the planning system plays a crucial role in decision making, planning, and navigation.

The planning system may be broken down into the following hierarchical planners (which may also be referred to as planning units, planning sub-systems, planning modules, etc.): mission planner, behavior planner, and motion planner. The motion planner receives as input a planned behavior from the behavior planner as well as information about the perceived environment, to output a trajectory for the autonomous vehicle. In the present disclosure, a trajectory is a sequence, over multiple time steps, of position coordinates and orientations that the autonomous vehicle should follow. Other parameters may be defined in the trajectory, such as vehicle velocity and/or vehicle acceleration.

Some approaches to motion planning involves a trajectory generator, trajectory evaluator and trajectory selector. The trajectory generator typically uses some a priori knowledge (e.g., vehicle dynamics and kinematics) to only generate reasonable trajectories and reduce the search space. The trajectory evaluator typically evaluates the generated trajectories (e.g., using some quantitative metrics) to compare and rank the trajectories. The trajectory selector typically selects one desired trajectory based on the evaluation of the generated trajectories.

Existing rule-based motion planning techniques typically require optimization according to explicitly defined cost functions. Such rules-based approaches are typically hard to maintain and do not scale well in complex dynamic scenarios. Additionally, explicitly defined cost functions are typically not general enough and difficult to adjust to account for complex dynamic interactions.

Other motion planning techniques use machine learning-based approaches, which learn from human driving patterns. For example, Zeng et al. ("End-to-End Interpretable Neural Motion Planner", *IEEE Conference on Computer Vision and Pattern Recognition (CVPR)*, 2019) describes an end-to-end supervised learning approach that learns to assign better evaluation to trajectories that are more similar to human driving data and worse evaluations to trajectories that are more different from human driving data. In another example, Bansal et al. ("ChauffeurNet: Learning to Drive by Imitating the Best and Synthesizing the Worst", *Robotics: Science and Systems,* 2019) uses a neural network to directly predict a future trajectory from its history based on human driving data, and this predicted trajectory is then used as the output of the motion planner.

Such approaches, which rely on a human expert for training, are generally limited to the expert's performance and experience. Such approaches may fail to adequately explore parts of the state-action space that may be less critical for safety and performance. Accordingly, it would be useful to provide a machine learning-based approach to motion planning that is not reliant on experts' performance.

SUMMARY

In various examples, the present disclosure describes methods and systems that use machine learning-based approaches for motion planning in autonomous vehicles. Different examples of machine learning-based approaches are described, including approaches to training a RL agent-based trajectory evaluator that enable the trajectory evaluator to learn from its previous experience without being limited to human-generated training data.

In various examples, the present disclosure describes a motion planner that receives as input a current state (which may include information about the perceived environment as well as a planned behavior) and optionally a prediction in future time steps, and selects a planned trajectory to follow based on optimization of a certain metric. Generally, the planned trajectory may be selected in order to achieve a safer and faster (but within the speed limit) driving experience.

In various examples, the present disclosure describes a RL approach for training a trajectory evaluator to assign evaluation values to candidate trajectories. The trajectory evaluator may be trained using training data that include explicitly defined trajectories (e.g., defined mathematically by an explicit function or formula), or may be trained using training data that include trajectory parameters. Training using explicitly defined trajectories may enable more flexibility in how the trajectories are generated. Training using trajectory parameters may enable faster training and more thorough exploration of a smaller trajectory space.

In some examples, the trajectory evaluator may generate probabilistic evaluation values, characterized by statistical metrics. This is enabled through training using distributional reinforcement learning.

In some examples, the present disclosure describes a system for training a motion planner for an autonomous vehicle. The system includes a processing unit configured to execute instructions to cause the system to: receive, as input to a trajectory evaluator agent of the motion planner, a first set of state data defining a current state of the autonomous vehicle and an environment at a current time step; select, based on the current state, a selected trajectory; determine a calculated reward for the selected trajectory, the calculated reward being calculated based on performance of the selected trajectory in the current state; receive a second set of state data defining a next state of the autonomous vehicle and the environment at a next time step; and update parameters of the trajectory evaluator agent based on the current state, selected trajectory, calculated reward and next state, the parameters of the trajectory evaluator agent being updated to assign an evaluation value for the selected trajectory that reflects the calculated reward and expected performance of the selected trajectory in the future states.

In some examples, the present disclosure describes a method for training a motion planner for an autonomous vehicle. The method includes: receiving, as input to a trajectory evaluator agent of the motion planner, a first set of state data defining a current state of the autonomous vehicle and an environment at a current time step; selecting, based on the current state, a selected trajectory; determining a calculated reward for the selected trajectory, the calculated reward being calculated based on performance of the selected trajectory in the current state; receiving a second set of state data defining a next state of the autonomous vehicle and the environment at a next time step; and updating parameters of the trajectory evaluator agent based on the current state, selected trajectory, calculated reward and next state, the parameters of the trajectory evaluator agent being updated to assign an evaluation value for the selected trajectory that reflects the calculated reward and expected performance of the selected trajectory in the future states.

In some examples, the present disclosure describes a computer-readable medium storing instructions for execution by a processing unit of a system for training a motion planner for an autonomous vehicle, the instructions when executed causing the system to: receive, as input to a trajectory evaluator agent of the motion planner, a first set of state data defining a current state of the autonomous vehicle and an environment at a current time step; select, based on the current state, a selected trajectory; determine a calculated reward for the selected trajectory, the calculated reward being calculated based on performance of the selected trajectory in the current state; receive a second set of state data defining a next state of the autonomous vehicle and the environment at a next time step; and update parameters of the trajectory evaluator agent based on the current state, selected trajectory, calculated reward and next state, the parameters of the trajectory evaluator agent being updated to assign an evaluation value for the selected trajectory that reflects the calculated reward and expected performance of the selected trajectory in the future states.

In any of the above, the first set of state data and the second set of state data each independently may include state data encoded in the form of 2D images.

In any of the above, the parameters of the trajectory evaluator agent may be updated according to the equation: $V(s_t,\tau_t) \leftarrow r_t + \gamma V(s_{t+1},\tau_{t+1})$; where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $V(s_{t+1},\tau_{t+1})$ is an evaluation value for the selected trajectory at the next time step and the next state, and $\gamma$ is a discount factor.

In any of the above, the parameters of the trajectory evaluator agent may be updated according to the equation: $V(s_t,\tau_t) \leftarrow r_t + \gamma V(s_{t+1},TS(s_{t+1}))$; where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $TS(s_{t+1})$ is a next selected trajectory at the next time step, $V(s_{t+1},TS(s_{t+1}))$ is an evaluation value for the next selected trajectory and the next state, and $\gamma$ is a discount factor.

In any of the above, the evaluation value may be generated as a set of statistical metrics defining a probability distribution of a probabilistic evaluation value.

In any of the above, the selected trajectory may be selected according to a selection criteria based on one or more statistical metrics.

In any of the above, the set of data defining the candidate trajectory may be a set of parameters defining the candidate trajectory according to a trajectory generation function.

In any of the above, the instructions may further cause the system to (or the method may include): generate the selected trajectory from the set of parameters, according to the trajectory generation function.

In any of the above, the selected trajectory may be defined by a set of 2D images defining waypoints of the candidate trajectory over multiple time steps.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also referred to as unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Figure 1:
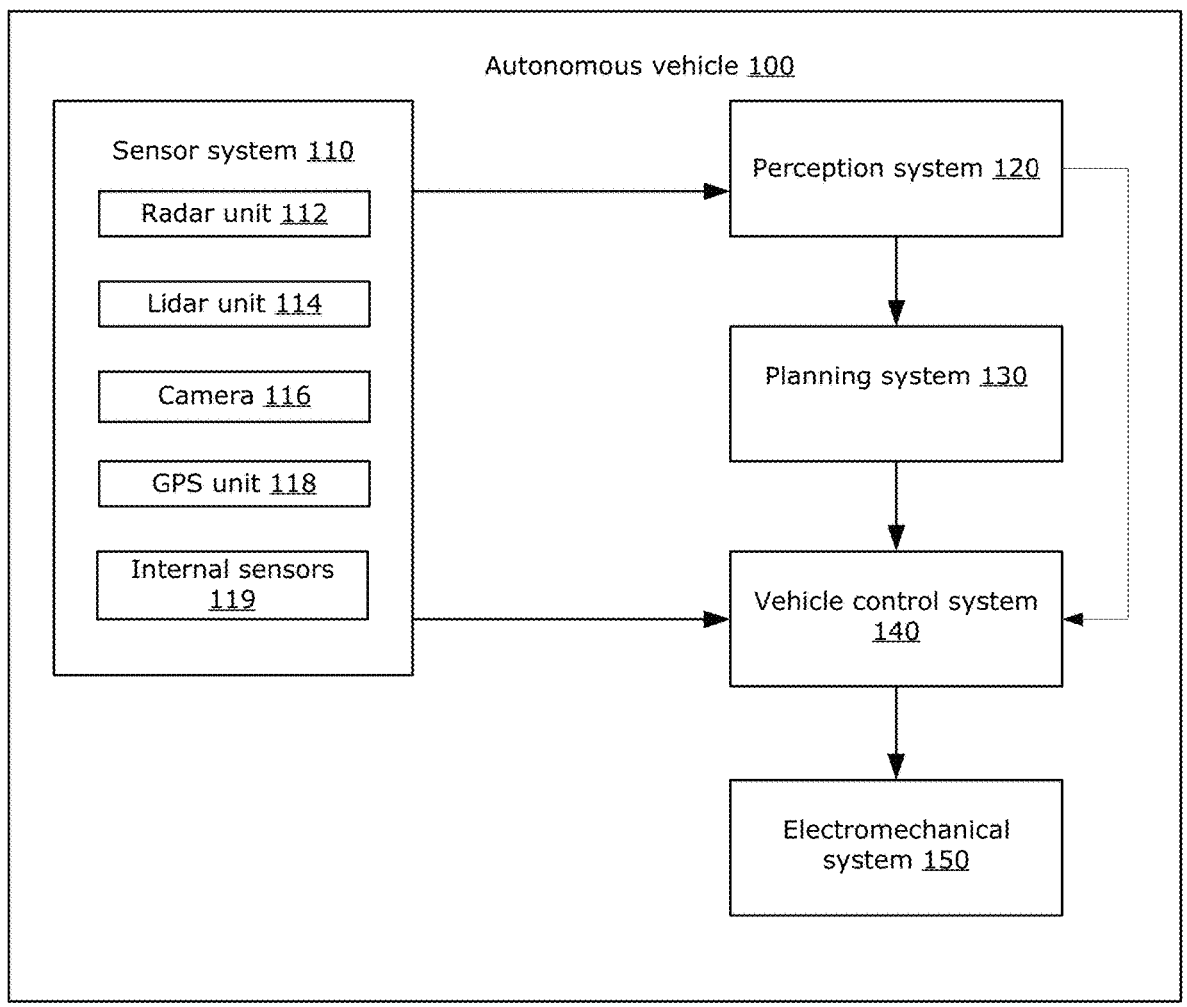
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other autonomous vehicles, as discussed above.

The vehicle 100 includes a sensor system 110, a perception system 120, a path planning system 130, a vehicle control system 140 and an electromechanical system 150, for example. Other systems and components may be included in the vehicle 100 as appropriate. The perception system 120, the path planning system 130, and the vehicle control system 140 in this example are distinct software systems that include machine readable instructions that may be executed by one or more processors in a processing unit of the vehicle 100. Alternatively, the perception system 120, the path planning system 130, and the vehicle control system 140 may be distinct systems on one or more chips (e.g., application-specific integrated circuit (ASIC), field-programmable gate array (FGPA), and/or other type of chip). For example, the perception system 120, the path planning system 130, and the vehicle control system 140 may be implemented using one chip, two chips, or three distinct chips (using the same or different types of chips). Various systems and components of the vehicle may communicate with each other, for example through wired or wireless communication. For example, the sensor system 110 may communicate with the perception system 120 and the vehicle control system 140; the perception system 120 may communicate with the path planning system 130 and the vehicle control system 140; the path planning system 130 may communicate with the vehicle control system 140; and the vehicle control system 140 may communicate with the electromechanical system 150.

FIG. 1 illustrates example flows of data (indicated by arrows) from the sensor system 110 to the perception system 120, to the path planning system 130, to the vehicle control system 140, and to the electromechanical system 150 (discussed in further detail below). However, it should be understood that data may be communicated among the systems 110, 120, 130, 140, 150 in various different ways, and there may be two-way data communication among the systems 110, 120, 130, 140, 150.

The sensor system 110 includes various sensing units, such as a radar unit 112, a LIDAR unit 114, and a camera 116, for collecting information about an environment surrounding the vehicle 100 as the vehicle 100 operates in the environment. The sensor system 110 also includes a global positioning system (GPS) unit 118 for collecting information about a location of the vehicle in the environment. The sensor system 110 also includes one or more internal sensors 119 for collecting information about the physical operating conditions of the vehicle 100 itself, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, etc. Other sensors not shown in FIG. 1 may be included in the sensor system 110, such as environmental sensors for sensing external conditions such as an external temperature and pressure, precipitation, and noise, among other possibilities.

Information collected by the sensor system 110 is provided as sensor data to the perception system 120. The perception system 120 processes the sensor data to generate state data about the internal state of the vehicle and state data about the state of the environment surrounding the vehicle 100. State data about the internal state of the vehicle may include, for example, data defining a vehicle location (e.g., including data about a position and orientation of the vehicle 100, which may be in absolute geographical longitude/latitudinal values and/or values that reference other frames of reference), and/or vehicle operation (e.g., including data about kinodynamic parameters of the vehicle, such as linear speed and acceleration, travel direction, angular acceleration, pose (e.g., pitch, yaw, roll), and vibration, and mechanical system operating parameters such as engine RPM, throttle position, brake position, and transmission gear ratio, etc.). State data about the state of the environment surrounding the vehicle 100 may include, for example, information about detected stationary and moving objects around the vehicle 100, weather and temperature conditions, road conditions, road configuration and other information about the physical environment.

Generally, the term kinodynamics relates to a class of problems, in robotics and motion planning, in which velocity, acceleration, force/torque bounds must be satisfied and where kinematic constraints (e.g., obstacle avoidance) must also be satisfied. Kinodynamic parameters are those parameters, such as described above, that are relevant to this type of motion planning problem. In some embodiments, kinodynamic parameters may include one or more of: a maximum acceleration, a maximum deceleration, a maximum rotation speed of the steering wheel of the vehicle 100, a kinematic model of the vehicle 100, a width or length of the vehicle 100, a minimum turning radius, and so on.

In some examples, the sensor system 110 or the perception system 120 may also have access to a map (not shown), which may be a reference map that represents known information about the surrounding environment. For example, the map may be received from an external reference database (e.g., retrieved based on the vehicle's position, as determined using the GPS unit 118).

For example, sensor data received from the radar, LIDAR and camera units 112, 114, 116 may be used to determine the local environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). Sensor data from GPS unit 118 and other sensors may be used to determine the vehicle's location, defining a geographic position of the vehicle 100. Sensor data from internal sensors 119, as well as from other sensor units, may be used to determine the vehicle's kinodynamic parameters, including speed and pose of the vehicle 100 relative to a frame of reference.

The perception system 120 in the present disclosure is described as a general system that performs various sensing and processing functions. In some implementations, the perception system 120 may be implemented using various sub-systems for performing different functions. For example, the perception system 120 may provide the functions of sensing, sensor fusion, localization, semantic understanding, object detection and tracking, and/or processing a world mode, among others. Some of these functions may be implemented using different sub-systems (e.g., a fusion sub-system or a state estimator sub-system) within the perception system 120, in some practical implementations. The present disclosure refers to the perception system 120 in general, for simplicity, and without loss of generality. The data outputted by the perception system 120 may include data that is minimally processed (e.g., normalized and/or filtered to remove noise). The perception system 120 may also perform more extensive processing of the sensor data, for example to generate an Occupancy Grid Map (OGM) and predicted future OGMs, to detect and classify objects of interest (e.g., other vehicles, pedestrians, etc.), to detect position and speed of objects categorized by their class, to detect road lane markings and the position of the center of lane, etc. Thus, the data outputted by the perception system 120 may include both analyzed (or estimated) data (e.g., OGMs and object classifications) as well as simple data (e.g., vehicle speed, vehicle acceleration, etc.).

The data is outputted from the perception system 120 in real-time to the planning system 130, which is the focus of the current disclosure and will be described in greater detail below. The vehicle control system 140 serves to control operation of the vehicle 100 based on target objectives set by the planning system 130. The vehicle control system 140 may be used to provide full, partial or assistive control of the vehicle 100. The electromechanical system 150 receives control signals from the vehicle control system 140 to operate the electromechanical components of the vehicle 100 such as an engine, transmission, steering system and braking system.

As mentioned previously, the perception system 120, planning system 130 and the vehicle control system 140 may be implemented as software that includes machine readable instructions that are executable by one or more processing units of a processing system of the vehicle 100.

Figure 2:
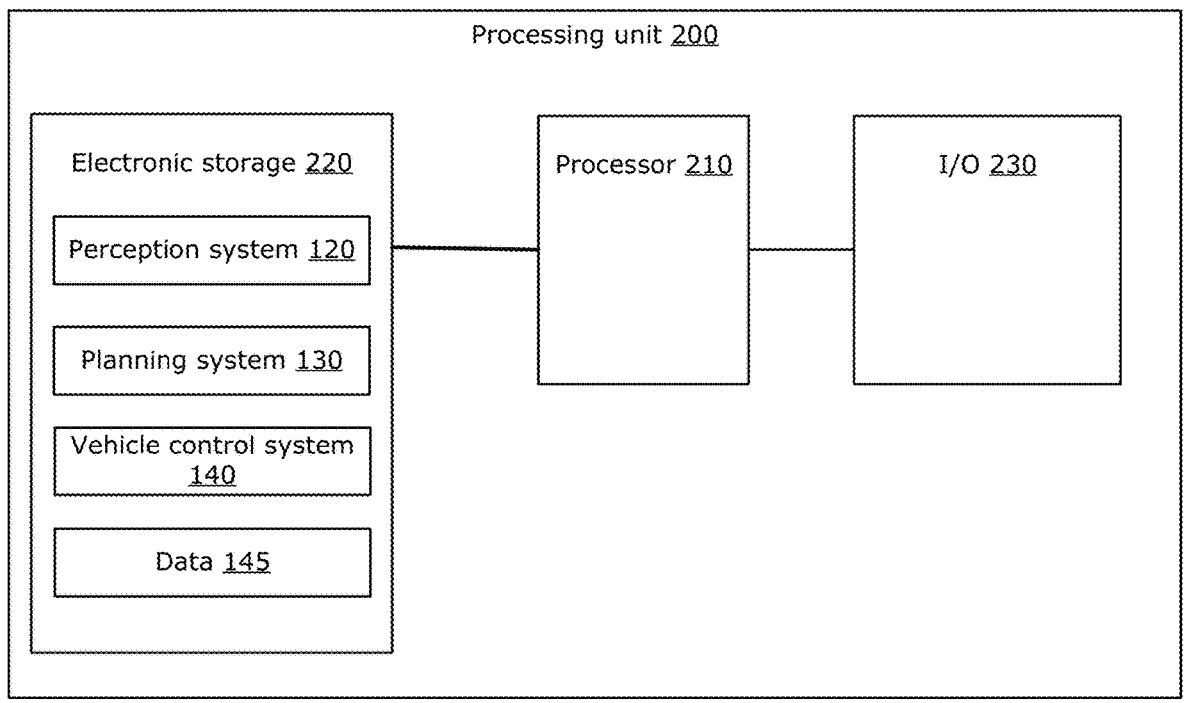
FIG. 2 is block diagram illustrating some components of a processing unit that may be used to implement a path planning system of the autonomous vehicle of FIG. 1 according to example embodiments.

FIG. 2 shows illustrates an example of a processing unit 200 that may be implemented in the vehicle 100. The processing unit 200 includes one or more processors 210. The one or more processors 210 may include a central processing unit (CPU), a graphical processing unit (GPU), a tensor processing unit (TPU), a neural processing unit (NPU), a digital signal processor or other computational element. The processor(s) 210 are coupled to an electronic storage 220 and to one or more input and output (I/O) interfaces or devices 230. The electronic storage 220 can include one or more non-transient or tangible memories (for example flash memory) and/or transient memories (for example RAM). The tangible memory(ies) may store instructions, data and/or software modules for execution by the processor(s) 210 to carry out the functions of the systems described herein. The tangible memory(ies) of the electronic storage 220 may store other software instructions and data for implementing other operations of the vehicle 100.

The electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 2, the electronic storage 220 of the processing unit 200 stores instructions (executable by the processor(s) 210) for implementing the perception system 120, the planning system 130, and the vehicle control system 140. In some embodiments, the electronic storage 220 also stores data 145, including sensor data provided by the sensor system 110 and data utilized by the planning system 130 to generate a driving plan, such as maps for the current environment.

Figure 3:
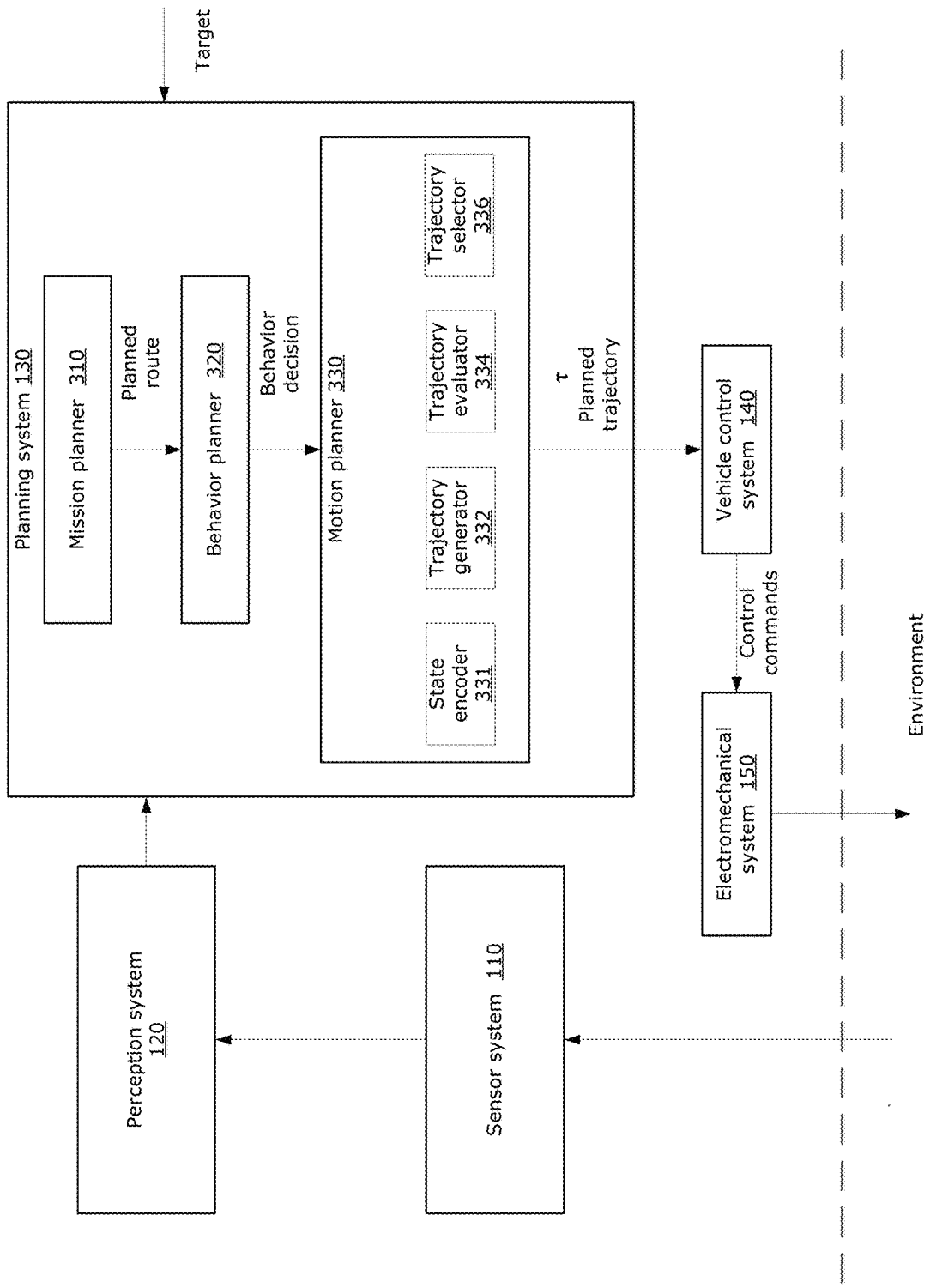
FIG. 3 is a block diagram illustrating further details of an example path planning system.

FIG. 3 is a block diagram that illustrates further details of the planning system 130; some components of the vehicle 100 have been omitted for clarity. It should be understood that, in some examples involving machine learning, the planning system 130, or modules or subsystems of the planning system 130, may be trained outside of the vehicle 100 (e.g., in a simulator system). In examples discussed below, at least the motion planner 330 may be trained in a simulator.

Generally, planning and decision making may be performed at three levels, namely at the mission level (e.g., performed by the mission planner 310), at the behavior level (e.g., performed by the behavior planner 320) and at the motion level (e.g., performed by the motion planner 330).

Generally, the purpose of planning and decision making is to determine a path for the vehicle 100 to travel from a first position (e.g., the vehicle's current position and orientation, or an expected future position and orientation) to a target position (e.g., a final destination defined by the user). Planning may also include determining one or more sub-paths to one or more intermediate target positions. The planning system 130 determines the appropriate path and sub-paths with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads).

Planning and decision making by the planning system 130 may be dynamic, and be repeatedly performed as the environment changes. Changes in the environment may be due to movement of the vehicle 100 (e.g., vehicle 100 approaches a newly-detected obstacle) as well as due to the dynamic nature of the environment (e.g., moving pedestrians and other moving vehicles).

As mentioned above, planning and decision making may be performed at different levels, for example at the mission level, behavior level and motion level. Mission level planning is considered to be a higher (or more global) level of planning, motion level planning is considered to be a lower (or more localized) level of planning, and behavior level planning is considered to be between mission and motion level. Generally, the output of planning and decision making at a higher level may form at least part of the input for a lower level of planning and decision making.

Planning at the mission level (more simply referred to as mission planning) relates to planning a path for the autonomous vehicle at a high, or global, level. The first position of the vehicle 100 may be the starting point of the journey (e.g., the user's home) and the target position of the vehicle 100 may be the final destination point (e.g., the user's workplace). Selecting a route to travel through a set of roads is an example of mission planning. Generally, the final destination point, once set (e.g., by user input) is unchanging through the duration of the journey. Although the final destination point may be unchanging, the path planned by mission planning may change through the duration of the journey. For example, changing traffic conditions may require mission planning to dynamically update the planned path to avoid a congested road. The user may also change the final destination point at any time during the journey.

Input data for mission planning may include, for example, GPS data (e.g., to determine the starting point of the vehicle 100), geographical map data (e.g., from an internal or external map database), traffic data (e.g., from an external traffic condition monitoring system), the final destination point (e.g., defined as x- and y-coordinates, or defined as longitude and latitude coordinates), as well as any user-defined preferences (e.g., preference to avoid toll roads).

The planned path output from mission planner 310 defines the route to be travelled to reach the final destination point from the starting point. The planned path output from the missing planner 310 may include a set of intermediate target positions (or waypoints) along the route. The intermediate target positions may be defined at road intersections to indicate which road to take at each intersection, for example. The intermediate target positions may be used for planning at the behavior level (e.g., decision making to decide the appropriate vehicle behavior).

The behavior planner 320 receives the planned path output from the mission planner 310, including the set of intermediate target positions (if any). The behavior planner 320 generates a behavior decision, in order to control the behavior of the vehicle 100 on a more localized and short-term basis than the mission planner 310. The behavior planner 320 also generates an output representing the behavior decision that may serve as a target for the motion planner 330. The behavior planner 320 may generate a behavior decision that is in accordance with certain rules or guidance. For example, the behavior planner 320 may ensure that the vehicle 100 follows certain behavior rules (e.g., left turns should be made from the left-most lane, vehicle speed should be within a speed limit, vehicle should stop at a stop sign, etc.). Such behavior rules may be based on traffic rules, as well as based on guidance for smooth and efficient driving (e.g., vehicle should take a faster lane if possible). The output representing the behavior decision generated by the behavior planner 320 may be in a variety of suitable formats. For example, the output representing the behavior decision generated by the behavior planner 320 may in the form of commands, signals (such as a safety signal), scalar values, and/or cost map (or cost image), among other possibilities. The output representing the behavior decision generated by the behavior planner 320 may serve as constraints on motion planning, for example.

The output representing the behavior decision may be in the form of commands that are provided to the motion planner 330. For example, the commands provided to the motion planner 330 may include motion planning constraints. The motion planner 330 should find a trajectory that satisfies the behavior decision, and that navigates the environment in a relatively safe, comfortable, and speedy way. The motion planner 330 should be designed to provide a safe and robust navigation on both structured and unstructured environments. A structured environment is generally an environment having well-defined drivable and non-drivable areas (e.g., a highway having clear lane markings), and which may have defined driving rules that all vehicles are expected to follow. An unstructured environment is generally an environment in which drivable and non-drivable areas are less defined (or undefined) (e.g., an open field), and which may have fewer or no driving rules for expected vehicle behavior. Regardless of whether the environment is structured or unstructured, the environment may also be highly dynamic (e.g., pedestrians and other vehicles are each moving) and each dynamic obstacle may have different and independent behaviors. This makes the design of the motion planner 330 challenging.

In the example shown in FIG. 3, the motion planner 330 includes a state encoder 331, a trajectory generator 332, a trajectory evaluator 334 and a trajectory selector 336. The state encoder 331 uses state data about the internal state of the vehicle, state data about the state of the surrounding environment of the vehicle 100 received from the perception system 120 and the output representing the behavior decision generated by the behavior planner 320 to generate a current state of the vehicle 100. The state of the vehicle 100 is defined by the sensed environment surrounding the vehicle (e.g., detected obstacles, detected lane markings, etc.) and the sensed internal environment of the vehicle (e.g., the vehicle's speed, acceleration, etc.) as sensed by the perception system 120 described above. The state $s_t$ of the vehicle 100 is also defined by the behavior decision generated by the behavior planner 320, as will be discussed further below. The trajectory generator 332 may be implemented using various suitable approaches, for example using expert-designed equations (e.g., polynomials) that generate trajectories for a current state of the vehicle 100. The trajectory evaluator 334 receives as input the current state of the vehicle 100 and at least one candidate trajectory from the trajectory generator 332, and assigns an evaluation value to each candidate trajectory. The assigned evaluation value is reflective of whether the candidate trajectory successfully achieves the goal of relatively safe, comfortable and speedy driving (and also satisfies the behavior decision). The trajectory evaluator 334 in the present disclosure is implemented using machine learning. In examples discussed below, the trajectory evaluator 334 is a software agent (hereinafter referred to as agent) that is trained to learn a function that correctly assigns a value to a candidate trajectory. The training of the trajectory evaluator 334 is based on reinforcement learning (RL), through interaction (actual or simulated) with the environment and receiving a reinforcement reward that quantifies the immediate impact of the trajectory that is followed by the actual or simulated vehicle 100. In some embodiments, the agent is implemented using a neural network that approximates the function that correctly assigns a value to a candidate trajectory. Parameters of the neural network are learned based on RL. The trajectory selector 336 selects the candidate trajectory with the highest evaluation value (as assigned by the trajectory evaluator 334) among the candidate trajectories generated by the trajectory generator 332.

Although the state encoder 331, trajectory generator 332, trajectory evaluator 334 and trajectory selector 336 are shown and discussed herein as separate blocks (e.g., separate modules, or separate functions) implemented in the motion planner 330, it should be understood that two or more of the state encoder 331, trajectory generator 332, trajectory evaluator 334 and trajectory selector 336 may be implemented together in a single block (e.g., within the same module, or algorithm).

Figure 4:
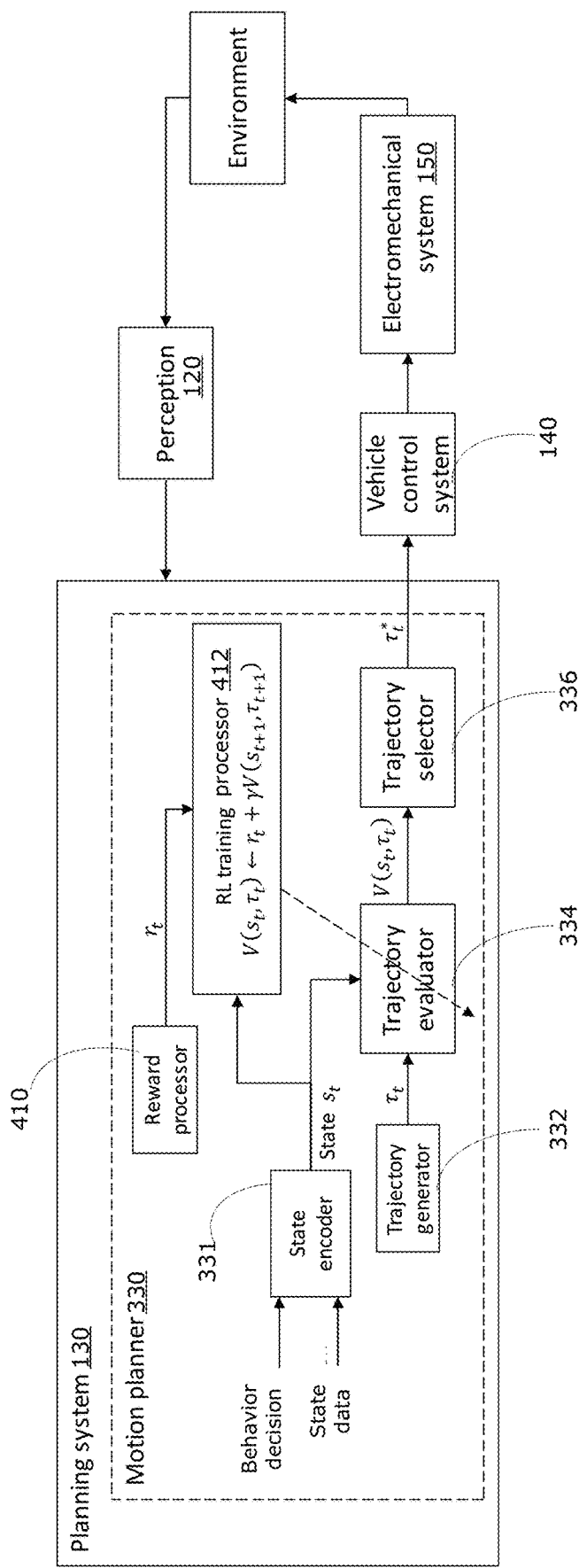
FIG. 4 is a block diagram illustrating an example training phase of a trajectory evaluator in a motion planner.

FIG. 4 is a block diagram illustrating details of an example motion planner 330 in the context of training the trajectory evaluator 334 of the motion planner 330. After sufficient training (e.g., the learned function and/or parameter (e.g. weights) of the trajectory evaluator 334 has converged), the trained trajectory evaluator 330 of the motion planner 330 may be used for inference, and may be implemented in the autonomous vehicle 100. For example, the trained motion planner 330 may be deployed (e.g. implemented) in the planning system 130 as illustrated in FIG. 3. The reward processor 410 and training processor 412 (discussed further below) are disabled when the trained trajectory evaluator 334 is deployed for inference.

Figure 5:
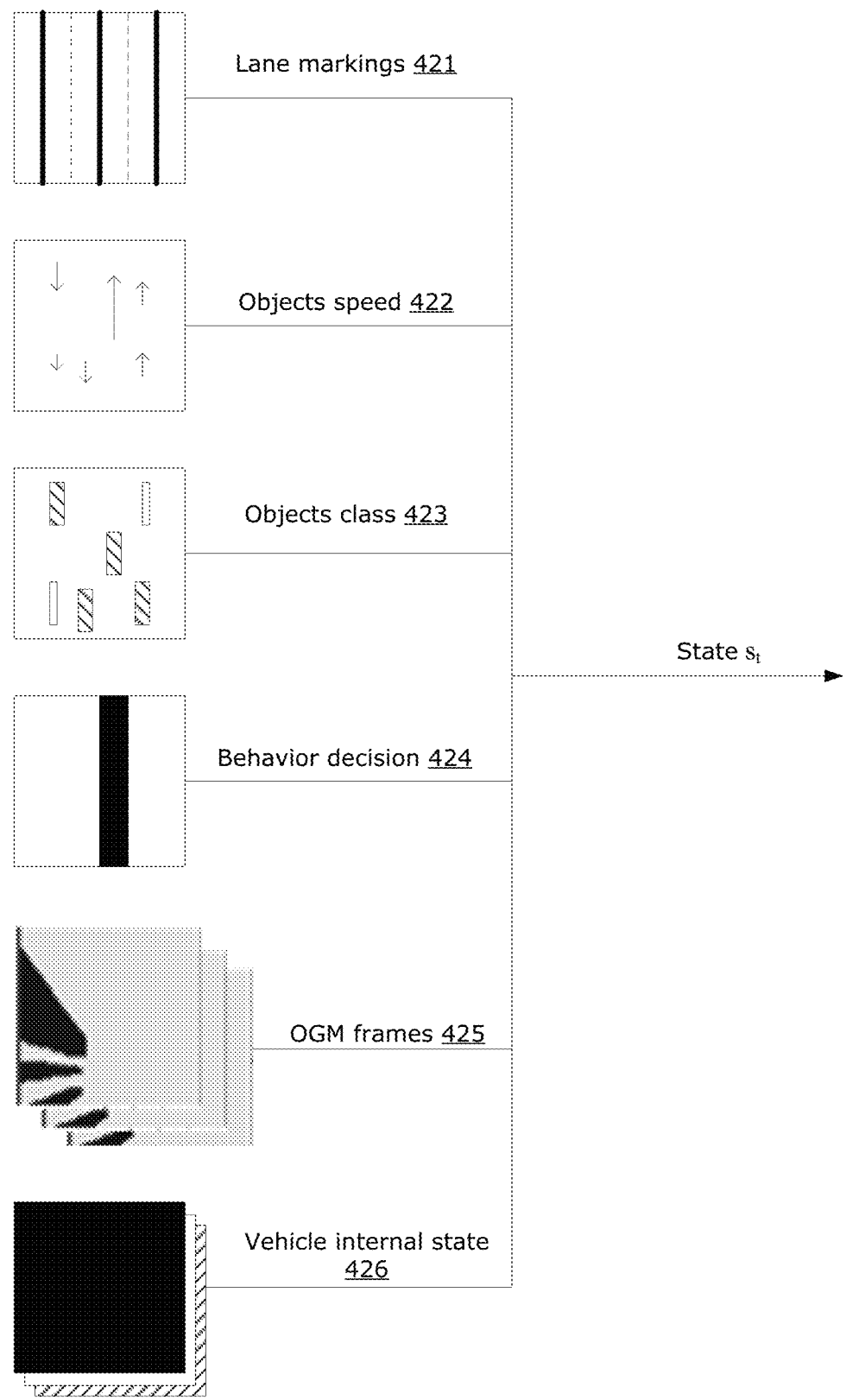
FIG. 5 illustrates examples of different state data encoded as 2D images.

The motion planner 330 includes the state encoder 331 that generates a current state (denoted as $s_t$) based on the state data about the internal state of the vehicle, the state data about the state of the environment surrounding the vehicle 100 received from the perception system 120 and the output representing the behavior decision received from the behavior planner 320. Some example state data about the internal state of the vehicle and state data about the environment surrounding the vehicle 100 that may be used to generate the current state $s_t$ are illustrated in FIG. 5 and discussed further below.

In some examples, training of the motion planner 330 may be continuous and ongoing, and may enable the motion planner 330 to be further refined based on real-life operation of the autonomous vehicle 100.

In the example shown, the training process involves a process of RL, to enable the trajectory evaluator 334 to learn to generate and assign appropriate estimated evaluation values to candidate trajectories. In a machine learning based approach, and in particular an RL based approach, as discussed herein, the trajectory evaluator 334 may be an agent implemented using a neural network. The agent of the trajectory evaluator 334 may be implemented using any suitable neural network architecture, including convolutional neural network (CNN), recurrent neural network (RNN), or a deep neural network, among other possibilities.

A general discussion of the training of the trajectory evaluator 334 is now presented. A trajectory in the context of the present disclosure is a sequence of waypoints over multiple time steps that define a planned path for the autonomous vehicle for a particular period of time. The trajectory may include waypoints that define, for each time step, planned vehicle position, planned vehicle orientation, planned vehicle velocity and/or planned vehicle acceleration, among other possible parameters. In some examples, a trajectory may be represented as a vector with the sequence of waypoints as the entries in the vector. If each waypoint contains multiple parameters (e.g., the waypoint defines both the planned vehicle position and orientation), the trajectory may be represented as a multidimensional vector.

At a current time step t, a candidate trajectory $\tau_t$ is provided as input to the trajectory evaluator 334. The candidate trajectory $\tau_t$ may be generated by the trajectory generator 332, based on a current state $s_t$. The candidate trajectory $\tau_t$ defines the planned waypoints for the autonomous vehicle 100 from the current time step t to some future time step t+T. The trajectory evaluator 334 also receives as input the current state $s_t$. The current state $s_t$ may represent the state of the external environment surrounding the vehicle 100, the internal state of the vehicle 100, and behavior decision generated by the behavior planner 320. The trajectory evaluator 334 maps the current state $s_t$ and the candidate trajectory $\tau_t$ to an evaluation value $V(s_t,\tau_t)$. The evaluation value is used to evaluate the candidate trajectory for its suitability to be used by the autonomous vehicle 100. As mentioned above, the trajectory evaluator 334 may be an agent and the agent may be implemented using a neural network. During training, the parameters of the neural network may be learned. The RL training processor 412 runs (e.g. executes) a reinforcement learning algorithm to update the parameters (e.g. weights) of the neural network until a termination criteria is met (e.g., performance has reached a minimum threshold).

The trajectory evaluator 334 estimates an evaluation value $V(s_t,\tau_t)$ for the candidate trajectory $\tau_t$. The candidate trajectory may be selected (also referred to as the selected trajectory) to be followed by the autonomous vehicle 100. As the autonomous vehicle 100 follows the selected trajectory, the autonomous vehicle 100 and sensed environment transitions from the current state $s_t$ into a next state $s_{t+1}$. If the training process is being conducted in a simulator (e.g., for safety and efficiency purposes), then components of the autonomous vehicle 100, such as the vehicle control system 140, electromechanical system 150, sensor system 110 and perception system 120 may be simulated in the simulator, and the environment may also be simulated. The perceived effect of the selected trajectory $\tau_t$ on the environment (whether simulated or actual) is used to generate feedback to the trajectory evaluator 334. In RL, the feedback may be in the form of a scalar quantity referred to as a reward $r_t$, which may be generated by the reward processor 410. The reward processor 410 may be implemented using a dedicated hardware device (e.g., with software instructions to implement a reward algorithm) or may be implemented using a software model that is executed by the processing unit 200 of the vehicle 100, or a combination thereof. Similarly, the RL training processor 412 may be implemented as hardware, software, or a combination thereof. If implemented as hardware, the reward processor 410 and the RL training processor 412 may be implemented together or separately in dedicated hardware. The reward processor 410 may receive the current state $s_t$, the selected action (i.e., selected trajectory $\tau_t$) and the next state $s_{t-1}$, and outputs the reward $r_t$. Alternatively, the reward processor 410 may receive just the next state $s_{t-1}$ and outputs the reward $r_t$. The reward $r_t$ reflects the performance of the selected trajectory in the environment. The reward processor 410 typically is designed such that the generated reward $r_t$ encourages safety, comfort, and mobility of the autonomous vehicle 100. Generally, the reward processor 410 generates a higher (or more positive) reward $r_t$ when the selected trajectory $\tau_t$ is closer to the desired goal of a safe, comfortable and fast path. For example, if the selected trajectory $\tau_t$ results in the autonomous vehicle 100 following the lane with a speed close to the speed limit, the reward $r_t$ is positive. In contrast, if the selected trajectory $\tau_t$ results in the autonomous vehicle 100 getting into an accident, the reward $r_t$ is negative. Through interaction and observing the reward $r_t$ for different trajectories $\tau_t$ in different states $s_t$, the trajectory evaluator 334 is trained to assign estimated evaluation values that more accurately reflect the desired goal.

The reward $r_t$ is used to train the trajectory evaluator 334 to learn the parameters (e.g. weights) of the neural network (discussed further below) for generating the estimated evaluation value $V(s_t,\tau_t)$, using RL. As shown, training of the trajectory evaluator 334 may be conducted using the RL training processor 412, which executes the RL algorithm based on Q-learning, as follows:

$$V(s_t,\tau_t) \leftarrow (r_t + \gamma V(s_{t+1},\tau_{t+1})) \qquad (1)$$

where $s_t$ is the state at time t, $s_{t+1}$ is the next state at time t+1, $\tau_t$ is the selected trajectory being evaluated at time t, $\tau_{t+1}$ is the next selected trajectory at time t+1, $r_t$ is the reward received at time t, and $V(s_t,\tau_t)$ is the evaluation value estimated for state $s_t$ and trajectory $\tau_t$. Additionally, $0<\gamma<1$ is a discount factor, which is a scalar value discounting the value of future states. The symbol $\leftarrow$ indicates that $V(s_t,\tau_t)$ is updated based on $(r_t+\gamma V(s_{t+1},\tau_{t+1}))$, though it should be noted that this updating is not necessarily a direct update but rather indicates the flow of information from $(r_t+\gamma V(s_{t+1},\tau_{t+1}))$ to $V(s_t,\tau_t)$ via other blocks as shown in FIG. 4. In the inference phase, the reward processor 410 and the RL training processor 412 are disabled.

Notably, because the trajectory evaluator 334 is not being trained using human-generated driving data, the trajectory evaluator 334 may be trained to better evaluate a variety of different trajectories (including trajectories that may be less likely to be explored in human-generated driving data) in a variety of complex states (including states that may be dangerous or difficult for a human to drive).

As noted above, the trajectory evaluator 334 may be an agent that is implemented using a neural network. In some examples, the state $s_t$ that is input to the trajectory evaluator 334 may be in the form of 2D images. For example, state data that represent spatial information (e.g., OGM, objects, lane markings, etc.) may be in the form of 2D images.

FIG. 5 illustrates some examples of how state data may be encoded by the state encoder 331 into a state $s_t$. Generally, 2D images may include one or more channels. In color 2D images, there are typically three channels to encode for red, green and blue intensities. Adapting this concept to state data, different channels may be used to encode different forms of information in the form of a 2D image as discussed below. The state data, in the form of 2D images may be concatenated together (e.g., as multiple channels of a single 2D image) to form the state $s_t$.

For example, the position of each detected object can be encoded as a 2D box (e.g., corresponding to the bounding box generated by an object detection algorithm). Each object class (e.g., bike, car, truck, pedestrian, etc.) may be encoded into 2D images using a respective separate channel or may represented by a respective different color in a single 2D image. In the example shown, the state data includes lane markings 421 (or other map information), which may be encoded in a single 2D image with separate channels to encode for left, right and center of the lane. Lane markings and/or drivable area can be encoded, for example as three lines in the 2D image representing the left boundary, right boundary and the center line of a lane. Each line can be encoded using a respective separate channel of an image, or may be represented with a respective different color (e.g., black represents the left boundary, green represents the center line, and brown represents the right boundary) in a single 2D image. Object speeds 422 may be encoded as intensity signals in a 2D image. For example, the speed of each object can be encoded as a line proportional to the speed value, and along its movement direction. The line can be further encoded to have a higher intensity for the starting position (e.g., at a current time) and a lower intensity as it extends towards the end position (e.g., projected position at the next time step). Object classes 423 may be encoded using different channels for each object class of interest (e.g., car, bicycle, pedestrian, etc.). The behavior decision 424 from the behavior planner 320 may be encoded as intensity signals indicating the target behavior of the vehicle 100 (e.g., continue straight). Each OGM frame 425 may be in the encoded in the form of a 2D or 3D matrix. A 3D matrix may be encoded as 2D images having multiple channels, for example. In the case where an OGM frame 425 is a 3D matrix, the height or depth of the image may contain information indicating the occupancy of objects at different heights or depths, respectively. In some examples, an OGM frame 425 can be represented by two 2D images, where one 2D image indicates occupancy at a predefined height and the second 2D image indicates the variance in occupancy from the predefined height. Moreover, each channel of an OGM frame 425 may correspond to a different respective timestamp, for example from a predefined past time point (e.g., a predefined number of time steps from the current time) to a predefined point in the future (e.g., predictions for a predefined number of future time steps). The OGM frame 425 includes at least one channel corresponding to a current timestamp (i.e., corresponding to the current sensor data). Scalar information (e.g., vehicle internal state 426 includes values that represent the internal state of the vehicle, such as speed, acceleration, etc.) can also be encoded as 2D images in separate channels. Alternatively, scalar information may be fed directly to the trajectory evaluator 334 at the fully connected layers of the neural network.

It should be noted that the behavior decision 424 may (with or without being encoded into a 2D signal as described above) also be inputted to the trajectory generator 332 to influence the generation of trajectories. For a given behavior decision, some trajectories may be relevant while other trajectories may not be permitted. For example, if the behavior decision is to make a right turn, curved trajectories may be relevant but straight trajectories may not be appropriate. In another example, if the behavior decision is to change to a right lane, relevant trajectories may include straight trajectories (e.g., staying in the current lane in case a lane change cannot be safely executed) and right-veering trajectories, but left-veering trajectories may not be appropriate. In another example, if the behavior decision is to stop for a stop sign, the trajectory generator may constrain the target speed in order to enforce stopping before the stop sign.

Other techniques for encoding data into 2D images may be used. For example, instead of using separate channels for encoding different object classes, all object classes of interest may be encoded into a single channel of the 2D image by assigning different intensity ranges for each object class (e.g., pixel intensity of 0-19 indicates a car, pixel intensity of 20-39 indicates a bicycle, etc.). Additional information (e.g., weather, object acceleration, predicted object behavior, etc.) may also be encoded into 2D images in a similar manner.

Encoding state data into 2D images may help to enable implementation of the trajectory evaluator 334 using a CNN (which is well-studied for processing 2D images). Although a CNN is discussed for implementing an example embodiment of the trajectory evaluator 334, it should be understood that the trajectory evaluator 334 may be an agent that is implemented using any suitable neural network (or suitable machine-learning technique), for example the agent of the trajectory evaluator 334 may be implemented using a RNN.

Figure 6:
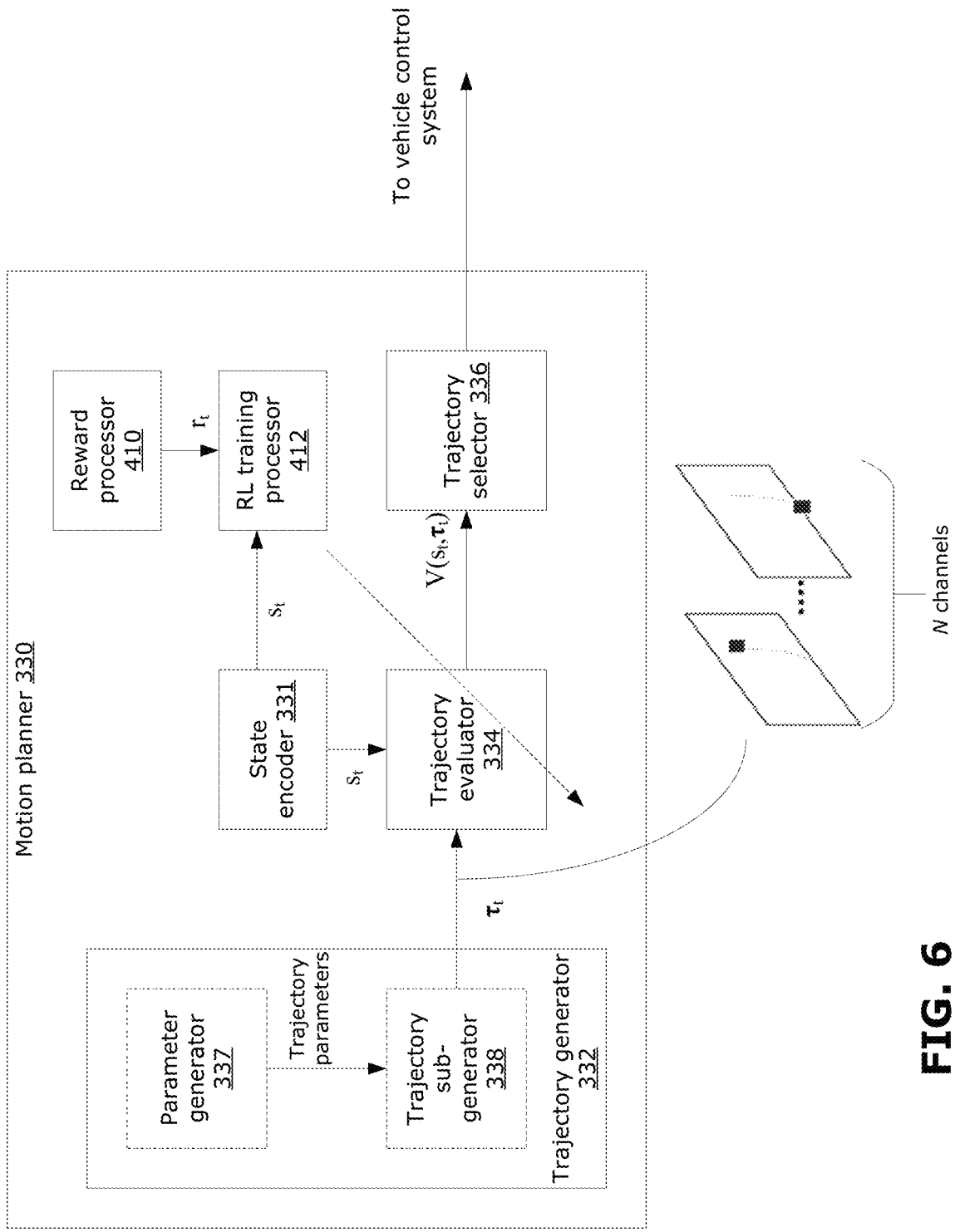
FIG. 6 illustrates an example implementation of a motion planner.

FIG. 6 is a block diagram illustrating an example implementation of the motion planner 330, illustrating the training of the trajectory evaluator 334.

In some examples, the trajectory generator 332 may be implemented using a parameter generator 337 and a trajectory sub-generator 338. The parameter generator 337 generates parameters (e.g., desired speed, lateral offset, etc.) to define the candidate trajectory to be generated. During training, the parameter generator 337 may randomly select parameter values from a defined range (e.g., based on input from a behavior decision). The trajectory parameters are used by the trajectory sub-generator 338 to generate a candidate trajectory $\tau_t$.

In this example, each candidate trajectory $\tau_t$ generated by the trajectory sub-generator 338 is in the form of a 2D image explicitly defining the trajectory as a set of waypoints in the 2D image. A trajectory may be encoded in various ways in a 2D image. For example, a sequence of points joined by a line in the 2D image may represent the geographical 2D location of each waypoint at each time step. The intensity (or thickness) of the line in the 2D image may encode the planned vehicle speed along the trajectory. As shown in FIG. 6, the trajectory may be encoded as a 2D image having N channels corresponding to N future time steps. In examples where predicted OGMs are part of the state data, the N future time steps may correspond to the prediction horizons of the OGMs received in the state data. For each channel, a box, representing the autonomous vehicle 100, may be placed at the planned position of the autonomous vehicle 100 at the corresponding time step along the trajectory.

The parameters (e.g. weights) of the neural network of the trajectory evaluator 334 are updated by the training processor 412, using the equation:

$$V(s_t,\tau_t) \leftarrow r_t + \gamma V(s_{t+1},\tau_{t+1}) \qquad (2)$$

For example, the learning by the trajectory evaluator 334 is performed by updating the function $V(s_t,\tau_t)$ based on the instantaneous reward $r_t$, discounted estimated future evaluation value $\gamma V(s_{t+1},\tau_{t+1})$, and the current estimated evaluation value. Example of which is:

$$\delta = r_t + \gamma V(s_{t+1},\tau_{t+1}) - V_\theta(s_t,\tau_t)$$

$$\theta = \alpha \times \delta \times \nabla_\theta V_\theta(s_t,\tau_t),$$

where $\theta$ is the set of neural networks weights, $V_\theta$ is the neural network using the weights $\theta$, $\delta$ is the error (to be brought to zero), $\alpha$ is the learning rate, and $\Lambda_\theta$ is the gradient based on $\theta$. The above equations illustrate an example approach to training the weights of the neural network of the trajectory evaluator 334, using gradient descent. Other training techniques may be used.

It should be recognized that equation (2) is based on equation (1) discussed above. The goal of equation (2) is to minimize the error value between the evaluation value generated by the trajectory evaluator 334 and the actual rewards that are expected to be received. In other words, training of the trajectory evaluator 334 is to learn the value function that would satisfy equation (2). In this example, it is assumed that the trajectory at time step t+1, $\tau_{t+1}$, is the continuation of the same trajectory at time step t, $\tau_t$, just mapped to time step t+1. In other words, the estimated evaluation value $V(s_t,\tau_t)$, corresponds to a hypothetical case where the autonomous vehicle 100 will follow the candidate trajectory $\tau_t$ for future time steps in addition to time step t. In this sense, it may be considered that while the reward is calculated based on a short-term performance (e.g., the instantaneous reward $r_t$ is calculated based on the performance at the next time step), the evaluation value corresponds to expected long-term performance. Note that the autonomous vehicle 100 might in fact follow a different trajectory than trajectory $\tau_t$ at time steps beyond t+1. Hence, the trajectory evaluator 334 is trained to learn the value $V(s_t,\tau_t)$ without requiring the autonomous vehicle 100 to follow the trajectory $\tau_t$ beyond t+1.

During the training phase, the autonomous vehicle 100 will follow candidate trajectory $\tau_t$ for time step t. With the advance of one time step, the autonomous vehicle 100 and the environment will transition to state $s_{t+1}$ at time t+1 which also yields reward $r_t$ in the process. The trajectory evaluator 334 is fed one candidate trajectory $\tau_t$, a current given state $s_t$, a next state $s_{t+1}$, and the reward $r_t$, all at a given time step t+1. In other words, a training data sample for the trajectory evaluator 334 consists of $(s_t, \tau_t, r_t, s_{t+1})$, and the training dataset for the trajectory evaluator 334 is the set of $(s_t, \tau_t, r_t, s_{t+1})_i$ for some range of i=0 to k. The trajectory evaluator 334 assumes $\tau_{t+1}$ based on $\tau_t$ and $s_{t+1}$ (as discussed above) so that $\tau_{t+1}$ is the continuation of $\tau_t$. In the training phase, the trajectory selector 336 may choose the trajectory $\tau_t$ with the highest evaluation value (evaluated by the trajectory evaluator 334) among possible trajectories generated by the trajectory generator 332. The trajectory selector 336 might also choose a random trajectory among possible trajectories generated by the trajectory generator 332. This process of choosing a random trajectory is designed to improve the training of the trajectory evaluator 334 by collecting data for trajectories that might be better but have not been tried (and evaluated) and/or were not included in the training dataset.

The trained trajectory evaluator 334 may then be implemented in an actual autonomous vehicle 100 for real-life use. During inference, the reward processor 410 and the RL training processor 412 are disabled. During inference, the trajectory generator 332 generates (i.e. infers) multiple candidate trajectories for a given state at a given time. The trained trajectory evaluator 334 assigns respective evaluation values to each of the multiple candidate trajectories for the given state at the given time. The trajectory selector 336 may then select, from among all the candidate trajectories, one selected trajectory having the highest assigned evaluation value. The selected trajectory is then provided to the vehicle control system 140 to generate control signals for the autonomous vehicle 100.

In the example discussed above, the trajectory evaluator 334 does not have any assumption or a priori knowledge about the candidate trajectory, or about how the trajectory generator 332 is designed. Thus, the trajectory evaluator 334 is trained to learn to correctly evaluate the candidate trajectories irrespective of how the trajectory generator 332 is implemented. Therefore, the trajectory generator 332 may be designed to generate candidate trajectories using any desired function (e.g., any polynomial) and/or based on any source (e.g., historical trajectories or human-driving data). In addition the trajectory generator 332 may be dynamically adjusted to generate candidate trajectories for different tasks/conditions (e.g., in accordance with the behavior decision from the behavior planner 320), without the need to retrain the trajectory evaluator 334.

The above example describes a training process that is agnostic about how candidate trajectories are generated. In many practical implementations a trajectory is usually generated using polynomial function that defines a candidate trajectory based on a limited set of scalar parameters. For example, a set of parameters defining a trajectory may include initial speed, final speed, initial orientation, initial offset from lane center, final offset from lane center, and trajectory horizon.

Figure 7:
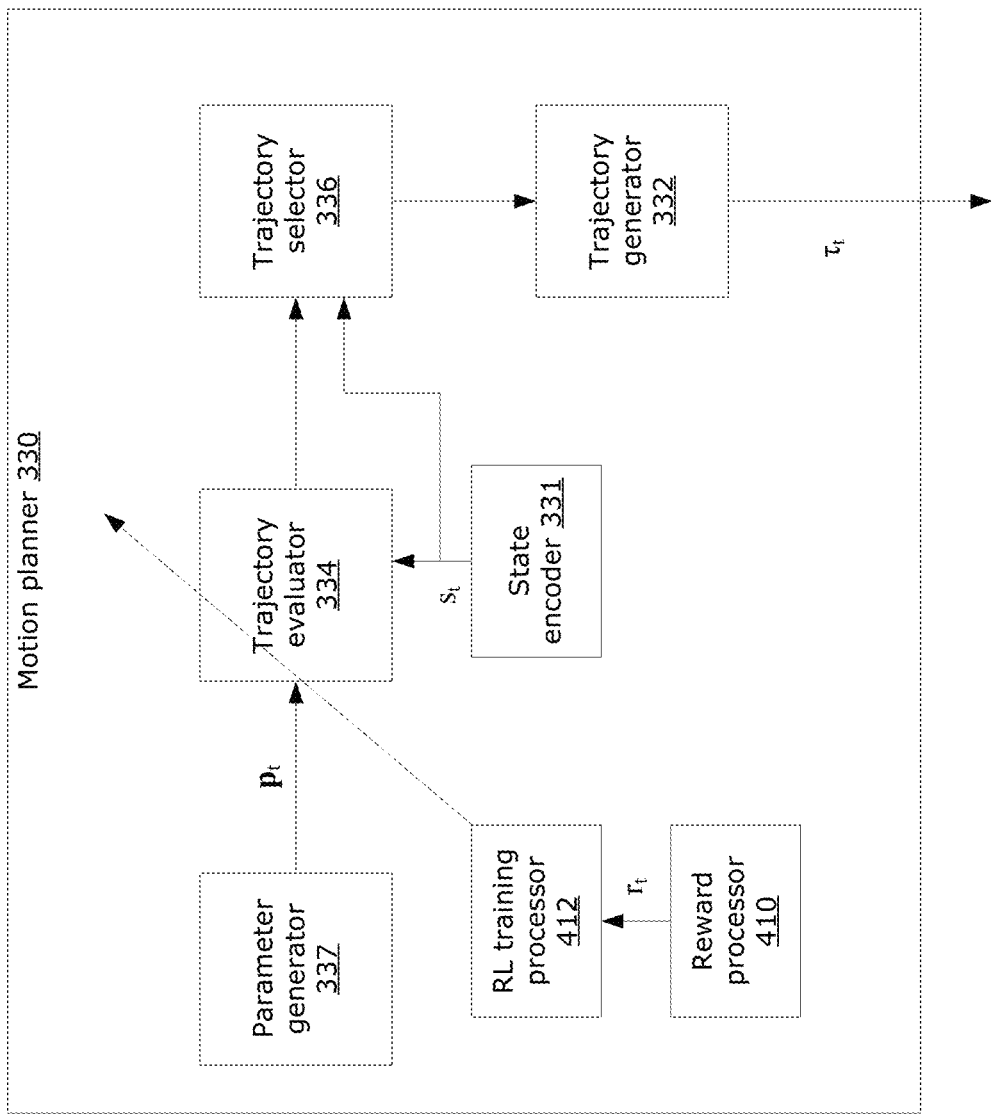
FIG. 7 illustrating another example implementation of a motion planner.

FIG. 7 is a block diagram illustrating another example implementation of the motion planner 330, showing the training phase of the trajectory evaluator 334.

In this example, the parameter generator 337 is separated from the trajectory generator 332. Instead of performing evaluation on the candidate trajectory itself, the trajectory evaluator 334 instead is trained to map the current state $s_t$ and the trajectory parameters that will be used to generate a trajectory $\tau_t$ to an evaluation value $V(s_t,\tau_t)$. Because the trajectory evaluator 334 is trained to evaluate the parameters that will be used by the trajectory generator 332, the training of the trajectory evaluator 334 inherently takes into account how a trajectory is generated (e.g., the type of polynomial used) from the trajectory parameters and the trained trajectory evaluator 334 is specific to a particular design of the trajectory generator 332 (e.g., a specific type of polynomial used by the trajectory generator 332 to generate trajectories).

In the training phase, the parameter generator 337 generates a set of parameters $p_t$ for generating a trajectory. Rather than defining the candidate trajectory explicitly, the parameters $p_t$ define a candidate trajectory indirectly (or implicitly). Rather than evaluating a candidate trajectory directly, the trajectory evaluator 334 is trained to evaluate the parameters that would be used by the trajectory generator 332 to generate a trajectory. The trajectory evaluator 334 is trained based on the effect of the generated trajectory on the environment, even though the trajectory evaluator 334 does not receive the generated trajectory as input. In some examples, it may be assumed that the trajectory at a future time step t+1, $\tau_{t+1}$, is generated using the same parameters that used for generating the trajectory at time step t, $\tau_t$. In other words, the trajectory generator 332 is trained to output the evaluation value $V(s_t,\tau_t)$, based on the assumption that the autonomous vehicle 100 will follow the candidate trajectory $\tau_t$ for future time steps.

In this example, the trajectory selector 336 serves as a function that performs a mapping from the current state $s_t$ to the parameters $p_t$ that yield the highest evaluation value.

During the training phase, the trajectory evaluator 334 is fed one set of parameters $p_t$ corresponding to the trajectory followed at time t, for a given state $s_t$, a next state $s_{t+1}$ resulting from following the trajectory corresponding to $p_t$ and the resulting reward $r_t$, all at a given time step t. In other words, a training data sample for the trajectory evaluator 334 consists of $(s_t, p_t, r_t, s_{t+1})$, and the training dataset for the trajectory evaluator 334 is the set of $(s_t, p_t, r_t, s_{t+1})_i$ for some range of i=0 to k.

The trained trajectory evaluator 334 may then be implemented in an actual autonomous vehicle 100 for real-life use. During inference, the reward processor 410 and the RL training processor 412 may be disabled. During inference, the parameter generator 332 generates multiple parameter sets for a given state at a given time. The trained trajectory evaluator 334 assigns respective estimated evaluation values to each of the multiple parameter sets for the given state at the given time. The trained trajectory selector 336 may then select, based on the given state, a selected parameter set to be used by the trajectory generator 332. The trajectory generator 332 then generates the trajectory according to the selected parameter set, and the trajectory generated according to the selected parameter set (also referred to simply as the selected trajectory) is then provided to the vehicle control system 140 to generate control signals for the autonomous vehicle 100. In general, the trajectory selector 336 may be any suitable software module that finds the trajectory that maximizes the output from the trajectory evaluator 334, given a state. The trajectory selector 336 may be implemented in various ways, including the approach described above. Other techniques for implementing the trajectory selector 336 include, for example, the trajectory selector 336 performing an iterative search, or a function (mapping from given state to desired trajectory) that finds the trajectory to maximize the output of the trajectory evaluator 334.

Compared to the example of FIG. 6, in the example of FIG. 7, the training of the trajectory evaluator 334 may be faster, because the space of different trajectories to be evaluated is smaller (i.e., limited to a particular function used by the trajectory generator 332). Further, performing training using trajectory parameters may enable the trajectory evaluator 334 to be trained on a continuous space of possible trajectories rather than a finite number of explicit trajectories (which may not fully explore the entire trajectory space, or may explore the space in a piecemeal fashion). The evaluation is performed in a continuous space, potentially resulting in better performance compared to the example of FIG. 6 where the evaluation is performed on a discrete (and finite) set of candidate trajectories. The result is that, compared to the example of FIG. 6, training the trajectory evaluator 334 in the manner illustrated by FIG. 7 enables faster training and better generalization (for a given trajectory generation function). Additionally, the trajectory selector 336 is able to directly output the selected parameters without having to consider multiple candidate trajectories, resulting in much faster processing during actual deployment in the inference phase.

In some examples, instead of assuming that the autonomous vehicle 100 will follow the same selected trajectory for future time steps, the training phase may be modified to account for the possibility that a different selected trajectory may be followed at a future time step. Considering the possibility of different trajectories in future, such a modification may help the motion planner 330 to find trajectories that are a combination of portions of trajectories from the set of trajectories that are within the domain of the trajectory generator 332. Therefore, this modified training may result in the motion planner 330 outputting more effective vehicle maneuvers than what is possible from set of trajectories available from the trajectory generator 332.

The training may be performed using the training RL processor 412 to learn the parameters of the following equation, which is slightly modified from equation (2) above:

$$V(s_t,\tau_t)=r_t+\gamma V(s_{t+1},TS(s_{t+1})) \quad (3)$$

where $TS(s_{t+1})$ is the output (i.e., selected trajectory or selected parameter set) of the trajectory selector 336 in the next time step, t+1, given the environment state $s_{t+1}$ at the next time step.

In this example, by avoiding the assumption that the trajectory is fixed for future steps, the trajectory evaluator 334 can be trained to take into account the possibility that the trajectory can be changed in future steps. This opens the search space to include trajectories that are not strictly within the trajectory space of the trajectory generator 336 (e.g., would include trajectories that change parameters at different time steps). The result may be that the motion planner 330 can provide output corresponding to movement that is a compound of multiple trajectories (e.g., following different trajectories at different time steps), which may be more complex and/or optimized than a single trajectory as defined by the trajectory generator 336.

In some examples, the estimated evaluation value assigned by the trajectory evaluator 334 may have a statistical character, rather than being a scalar value. That is, the estimated evaluation value for a given $(s_t,\tau_t)$ pair may be a probability distribution, which may reflect the characteristic of a stochastic environment in that only a likelihood of reward can be predicted for any given action in the stochastic environment. Distributional RL is an approach to learn the distribution of the estimated evaluation value for a $(s_t,\tau_t)$ pair compared to the average value in regular RL. Rather than assigning a scalar evaluation value to a candidate trajectory, the trajectory evaluator 334 may instead assign a probability distribution (e.g., defined by statistical metrics, such as mean, variance, maximum, minimum, etc.) to a candidate trajectory. As a result, the trajectory selector 336 may be designed to select on the basis of one or more statistical metrics. For example, a selected trajectory may be one that has the highest lower-bound in the distribution of the estimated evaluation value. Such a trajectory selection approach may result in more conservative (safer) motion planning in a non-deterministic environment with random events. In other words, the trajectory selector 336 chooses the trajectory that results in the best worst-case outcome, taking into account the probability of different events that might happen.

Figure 8:
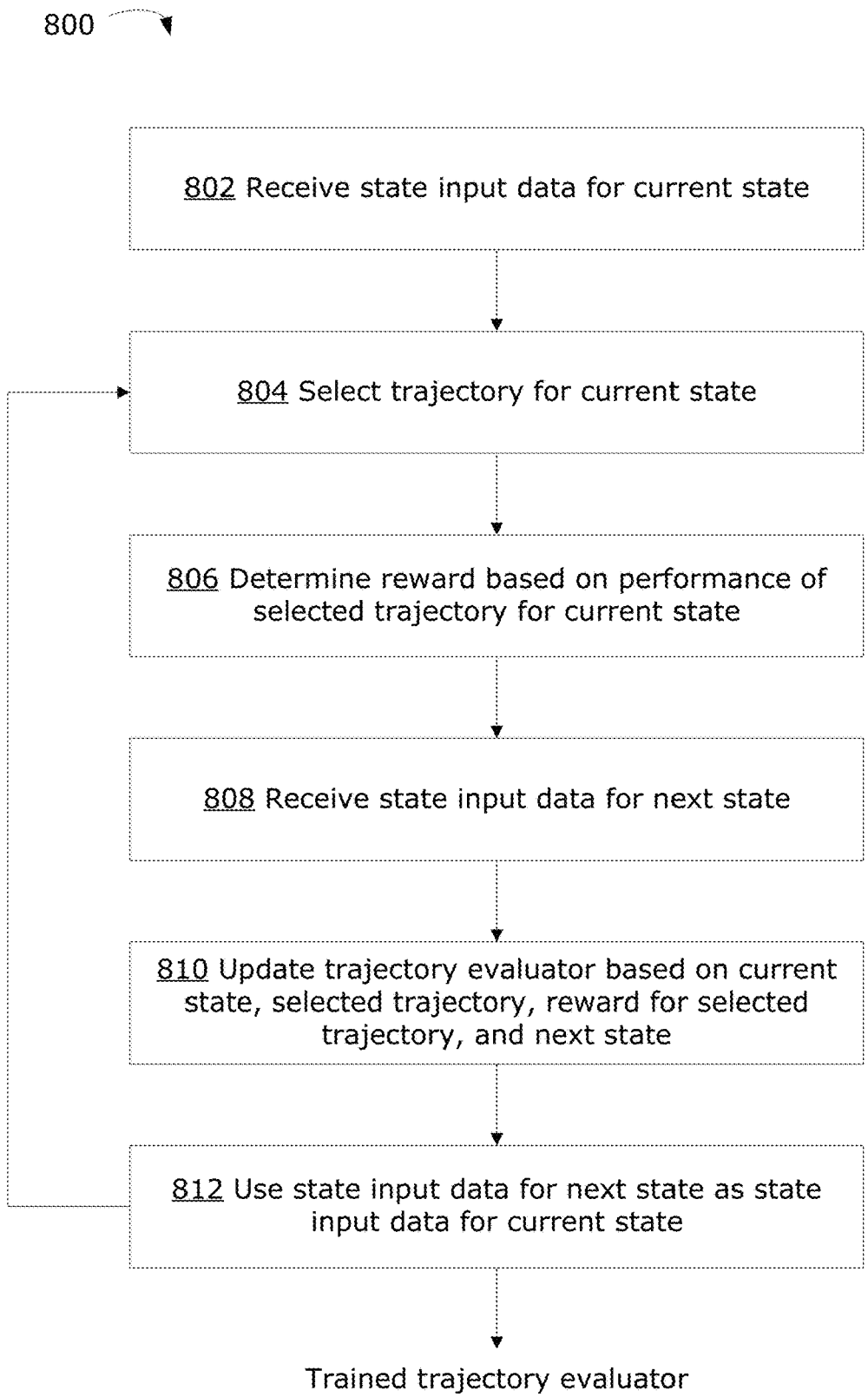
FIG. 8 is a flowchart illustrating an example method for training a motion planner.

FIG. 8 is a flowchart illustrating an example method 800 for training the motion planner 330. In particular, the method 800 may be used to train the agent of the trajectory evaluator 334 (which may be implemented using a neural network, such as a CNN or RNN). The method 800 may be performed by a system (e.g., a workstation or the autonomous vehicle 100 itself, implementing the processing unit 200 of FIG. 2). The training may be performed offline (e.g., in a simulator) or online (e.g., during actual driving).

At 802, a set of state data defining the (actual or simulated) current state of the autonomous vehicle and the environment is received. As discussed above, the state data may include data encoded as 2D images. The state data may be the observed state that is received from the perception system 120, for example.

At 804, a trajectory is selected for the current state (e.g., using the trajectory selector 336). In some examples, the selected trajectory may be calculated by using a set of parameters in a predefined trajectory generation function. A set of parameters is determined based on the current state (e.g., by applying a function to the state data to generate the set of parameters), and the selected trajectory is then generated using the determined parameters in the trajectory generation function. In other examples, the selected trajectory may be selected from a set of trajectories generated by the trajectory generator 332. The trajectory evaluator 334 calculates the evaluation value of each trajectory generated by the trajectory generator 332, then the trajectory selector 336 selects the trajectory having the highest calculated evaluation value as the selected trajectory. The evaluation value may represent the predicted reward if a given generated trajectory is selected as the selected trajectory to be followed by the autonomous vehicle. The evaluation value may be generated as a scalar value or as a set of statistical metrics (e.g., mean, variance, maximum, minimum, etc.) that define the probability distribution of a probabilistic evaluation value. If the evaluation value is generated as a set of statistical metrics, the trajectory selector 336 may select the selected trajectory based on one or more statistical selection criteria.

In some further examples, the trajectory generator 332 may further generate a refined set of trajectories based on the selection, the refined set of trajectories may be evaluated by the trajectory evaluator 334 and the trajectory selector 336 may make an updated selection from the refined set of trajectories (this further refining and selection may be conceptually equivalent to performing an iterative search).

At 806, the selected trajectory is followed by the vehicle 100 in the (actual or simulated) current state for one time step, and a reward is calculated based on the performance of the vehicle 100. The reward is calculated according to a reward function that is designed for the goal of safe, comfortable and speedy (within speed limits) driving.

At 808, a set of state data is received, which defines the (actual or simulated) next state of the autonomous vehicle and the environment at the next time step (i.e., at t+1).

At 810, parameters (e.g. weights) of the trajectory evaluator 334 (e.g., implemented as a CNN) are updated during training to better correspond to the discounted sum of expected future reward. For example, this may be according to equation (2) or equation (3) above.

At 812, the current state is updated with the state data of the next state (i.e., set $s_t = s_{t+1}$). The method 800 returns to step 804 to repeat the training with the updated state. The method 800 may continue until the trajectory evaluator 334 is sufficiently trained (e.g., the values of the weights of the trajectory evaluator 334 converge).

The trained motion planner may then be implemented in the autonomous vehicle 100 for deployment in real-life scenarios. In some examples, training may be carried out intermittently, even after deployment.

In various examples described herein, systems and methods are provided that enable training of a trajectory evaluator to learn evaluation of trajectories for autonomous driving using simple reward signals, based on RL.

The present disclosure describes examples for applying RL to train a trajectory evaluator agent to estimate evaluation values, based on one future time step. Various ways of encoding input data (e.g., input state) to enable implementation of the trajectory evaluator agent have been described.

Different approaches for encoding a trajectory and for defining the trajectory at the next time step have been described. For example, the trajectory at the next time step may be assumed to be the same as the trajectory at the current time step (just advanced one time step), or may be different (e.g., a different trajectory is selected based on the different state at the next time step).

Although examples have been described in the context of autonomous vehicles, it should be understood that the present disclosure is not limited to application in autonomous vehicles. For example, any trajectory planning application (e.g., for mobile robots, for semi-autonomous applications, for assisted-driving applications, etc.) may benefit from the present disclosure. The present disclosure may be useful for navigate a structured or unstructured environment, with static and/or dynamic obstacles.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system for training a motion planner for an autonomous vehicle, the system comprising a training processor configured to execute instructions to cause the system to:

train a trajectory evaluator reinforcement learning (RL) agent of the motion planner to assign evaluation values to trajectories generated by a trajectory generator of the motion planner, wherein each trajectory defines a respective planned path for the autonomous vehicle, the training including:

receiving, as input to the trajectory evaluator RL agent, a first set of state data defining a current state of the autonomous vehicle and an environment at a current time step;

receiving, from a trajectory selector of the motion planner, a selected trajectory defining a planned path for the autonomous vehicle, the planned path being defined as a sequence of waypoints over multiple time steps from the current time step to a future time step;

determining a calculated reward for the selected trajectory, the calculated reward being calculated based on performance of the selected trajectory in the current state;

receiving a second set of state data defining a next state of the autonomous vehicle and the environment at a next time step; and updating parameters of the trajectory evaluator RL agent based on the current state, selected trajectory, calculated reward and next state, the parameters of the trajectory evaluator RL agent being updated to assign an evaluation value for the selected trajectory that reflects the calculated reward and expected performance of the selected trajectory in the future states.

2. The system of claim 1, wherein the first set of state data and the second set of state data each independently includes state data encoded in the form of 2D images.

3. The system of claim 1, wherein the parameters of the trajectory evaluator RL agent are updated according to the equation:

$$V(s_t,\tau_t) \leftarrow r_t + \gamma V(s_{t+1},\tau_{t+1})$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $V(s_{t+1},\tau_{t+1})$ is an evaluation value for the selected trajectory at the next time step and the next state, and $\gamma$ is a discount factor.

4. The system of claim 1, wherein the parameters of the trajectory evaluator RL agent are updated according to the equation:

$$V(s_t,\tau_t) \leftarrow r_t + \gamma V(s_{t+1},TS(s_{t+1}))$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $TS(s_{t+1})$ is a next selected trajectory at the next time step, $V(s_{t+1},TS(s_{t+1}))$ is an evaluation value for the next selected trajectory and the next state, and $\gamma$ is a discount factor.

5. The system of claim 1, wherein the evaluation value is generated as a set of statistical metrics defining a probability distribution of a probabilistic evaluation value.

6. The system of claim 5, wherein the selected trajectory is selected by the trajectory selector according to a selection criteria based on one or more statistical metrics.

7. The system of claim 1, wherein the selected trajectory is defined by a set of parameters defining the selected trajectory according to a trajectory generation function.

8. The system of claim 7, wherein the processing unit is configured to execute instructions to further cause the system to:
generate, by the trajectory generator, the selected trajectory from the set of parameters, according to the trajectory generation function.

9. The system of claim 1, wherein the selected trajectory is defined by a set of 2D images defining the sequence of waypoints over the multiple time steps.

10. A method for training a motion planner for an autonomous vehicle, the method comprising:
training a trajectory evaluator reinforcement learning (RL) agent of the motion planner to assign evaluation values to trajectories generated by a trajectory generator of the motion planner, wherein each trajectory defines a respective planned path for the autonomous vehicle, the training including:
receiving, as input to the trajectory evaluator RL agent, a first set of state data defining a current state of the autonomous vehicle and an environment at a current time step;
receiving, from a trajectory selector of the motion planner, a selected trajectory defining a planned path for the autonomous vehicle, the planned path being defined as a sequence of waypoints over multiple time steps from the current time step to a future time step;
determining a calculated reward for the selected trajectory, the calculated reward being calculated based on performance of the selected trajectory in the current state;
receiving a second set of state data defining a next state of the autonomous vehicle and the environment at a next time step; and
updating parameters of the trajectory evaluator RL agent based on the current state, selected trajectory, calculated reward and next state, the parameters of the trajectory evaluator RL agent being updated to assign an evaluation value for the selected trajectory that reflects the calculated reward and expected performance of the selected trajectory in the future states.

11. The method of claim 10, wherein the first set of state data and the second set of state data each independently includes state data encoded in the form of 2D images.

12. The method of claim 10, wherein the parameters of the trajectory evaluator RL agent are updated according to the equation:

$$V(s_t,\tau_t) \leftarrow r_t + \gamma V(s_{t+1},\tau_{t+1})$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $V(s_{t+1},\tau_{t+1})$ is an evaluation value for the selected trajectory at the next time step and the next state, and $\gamma$ is a discount factor.

13. The method of claim 10, wherein the parameters of the trajectory evaluator RL agent are updated according to the equation:

$$V(s_t,\tau_t) \leftarrow r_t + \gamma V(s_{t+1},TS(s_{t+1}))$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $TS(s_{t+1})$ is a next selected trajectory at the next time step, $V(s_{t+1},TS(s_{t+1}))$ is an evaluation value for the next selected trajectory and the next state, and $\gamma$ is a discount factor.

14. The method of claim 10, wherein the evaluation value is generated as a set of statistical metrics defining a probability distribution of a probabilistic evaluation value.

15. The method of claim 14, wherein the selected trajectory is selected by the trajectory selector according to a selection criteria based on one or more statistical metrics.

16. The method of claim 10, wherein the selected trajectory is defined by a set of parameters defining the selected trajectory according to a trajectory generation function.

17. The method of claim 16, further comprising:
generating, by the trajectory generator, the selected trajectory from the set of parameters, according to the trajectory generation function.

18. The method of claim 10, wherein the selected trajectory is defined by a set of 2D images defining the sequence of waypoints over the multiple time steps.

19. A non-transitory computer-readable medium storing instructions for execution by a training processor of a system for training a motion planner for an autonomous vehicle, the instructions when executed causing the system to:
train a trajectory evaluator reinforcement learning (RL) agent of the motion planner to assign evaluation values to trajectories generated by a trajectory generator of the motion planner, wherein each trajectory defines a respective planned path for the autonomous vehicle, the training including:

receiving, as input to the trajectory evaluator RL agent, a first set of state data defining a current state of the autonomous vehicle and an environment at a current time step;

receiving, from a trajectory selector of the motion planner, a selected trajectory defining a planned path for the autonomous vehicle, the planned path being defined as a sequence of waypoints over multiple time steps from the current time step to a future time step;

determining a calculated reward for the selected trajectory, the calculated reward being calculated based on performance of the selected trajectory in the current state;

receiving a second set of state data defining a next state of the autonomous vehicle and the environment at a next time step; and updating parameters of the trajectory evaluator RL agent based on the current state, selected trajectory, calculated reward and next state, the parameters of the trajectory evaluator RL agent being updated to assign an evaluation value for the selected trajectory that reflects the calculated reward and expected performance of the selected trajectory in the future states.

20. The non-transitory computer-readable medium of claim 19, wherein the parameters of the trajectory evaluator RL agent are updated according to the equation:

$$V(s_t,\tau_t) \leftarrow r_t + \gamma V(s_{t+1},\tau_{t+1})$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $V(s_{t+1},\tau_{t+1})$ is an evaluation value for the selected trajectory at the next time step and the next state, and $\gamma$ is a discount factor.

21. The non-transitory computer-readable medium of claim 19, wherein the parameters of the trajectory evaluator RL agent are updated according to the equation:

$$V(s_t,\tau_t) \leftarrow r_t + \gamma V(s_{t+1},TS(s_{t+1}))$$

where $s_t$ is the current state at the current time step t, $\tau_t$ is the selected trajectory, $r_t$ is the calculated reward, $V(s_t,\tau_t)$ is the evaluation value for the selected trajectory at the current time step and the current state, t+1 is the next time step, $TS(s_{t+1})$ is a next selected trajectory at the next time step, $V(s_{t+1},TS(s_{t+1}))$ is an evaluation value for the next selected trajectory and the next state, and $\gamma$ is a discount factor.

* * * * *